US012413513B2

(12) United States Patent
Vasseur et al.

(10) Patent No.: US 12,413,513 B2
(45) Date of Patent: Sep. 9, 2025

(54) PREDICTIVE ROUTING USING RISK AND LONGEVITY METRICS

(71) Applicant: Cisco Technology, Inc., San Jose, CA (US)

(72) Inventors: Jean-Philippe Vasseur, Saint Martin d'Uriage (FR); Stéphane Bernard Martin, Lausanne (CH); Eduard Schornig, Haarlem (NL); Grégory Mermoud, Venthône (CH); Vinay Kumar Kolar, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/517,186

(22) Filed: Nov. 2, 2021

(65) Prior Publication Data
US 2023/0140115 A1 May 4, 2023

(51) Int. Cl.
H04L 45/50 (2022.01)
H04L 45/00 (2022.01)
H04L 45/12 (2022.01)
H04L 47/122 (2022.01)
H04L 47/2425 (2022.01)

(52) U.S. Cl.
CPC .......... H04L 45/50 (2013.01); H04L 45/123 (2013.01); H04L 45/38 (2013.01); H04L 47/122 (2013.01); H04L 47/2425 (2013.01)

(58) Field of Classification Search
CPC ....... H04L 45/50; H04L 45/123; H04L 45/38; H04L 47/122; H04L 47/2425
USPC .......................................................... 709/238
See application file for complete search history.

(56) References Cited

U.S. PATENT DOCUMENTS 9,338,065 B2  5/2016  Vasseur et al.
9,887,874 B2  2/2018  Vasseur et al.
10,313,211 B1  6/2019  Rastogi et al.
10,491,528 B2  11/2019  Zhang et al.
(Continued)

FOREIGN PATENT DOCUMENTS

EP        2811719           12/2014
WO    WO-2015175263 A1 *  11/2015    ......... H04L 41/0668

OTHER PUBLICATIONS

/spl mu/ service level agreement: a new bandwidth guarantee of flow-level granularity in internet VPN Chien-Chung Su;Wei-Nung Lee; Mong-Fong Horng;Jeng-Pong Hsu;Yau-Hwang Kuo The 7th International Conference on Advanced Communication Technology, 2005, ICACT 2005. Year: 2005 | vol. 1 | (Year: 2005).*
(Continued)

Primary Examiner — Scott B Christensen
(74) Attorney, Agent, or Firm — Lee & Hayes, P.C.; James M. Behmke

(57) ABSTRACT

In one embodiment, a device makes a prediction regarding service level agreement violations by a network transport available between a site and an online application. The device associates a risk metric with the prediction, based in part on a type of the network transport. The device computes a longevity metric for the prediction that indicates an expected validity period for the prediction. The device cause traffic to be routed between the site and the online application using the network transport, based on the prediction and its associated risk metric and its longevity metric.

20 Claims, 15 Drawing Sheets

(56) References Cited

U.S. PATENT DOCUMENTS

| | | | | |
|---|---|---|---|---|
| 2003/0149728 | A1* | 8/2003 | Wewalaarachchi | H04L 67/55 707/E17.108 |
| 2012/0087665 | A1* | 4/2012 | Li | H04L 45/12 398/79 |
| 2013/0246105 | A1* | 9/2013 | Winkler | G06Q 10/067 705/7.11 |
| 2015/0295856 | A1* | 10/2015 | Karthikeyan | H04L 47/726 370/230 |
| 2015/0333953 | A1* | 11/2015 | Vasseur | H04L 45/22 370/228 |
| 2016/0043932 | A1* | 2/2016 | Karthikeyan | H04L 12/18 370/390 |
| 2018/0123930 | A1 | 5/2018 | Zhang et al. | |
| 2020/0042647 | A1* | 2/2020 | Pandey | G06F 16/951 |
| 2020/0296172 | A1* | 9/2020 | Gunjal | H04L 41/5009 |
| 2020/0313979 | A1* | 10/2020 | Kumaran | H04L 41/16 |
| 2021/0058179 | A1* | 2/2021 | Bowler | H04W 52/0219 |
| 2021/0367892 | A1* | 11/2021 | Young | H04L 47/627 |

OTHER PUBLICATIONS

Service Level Management for Service Value Networks, Schulz, F. • Michalk, W. • Hedwig, M. • McCallister, M. • Momm, C. • Caton, S. • Haas, C. • Rolli, D. • Tavas, M. 2012 IEEE 36th Annual Computer Software and Applications Conference Workshops (pp. 51-56) (Year: 2012).*

* cited by examiner

| | LOADRISK.1 | LOADRISK.2 | LOADRISK.3 | LOADRISK.5 | LOADRISK.8 | LOADRISK.10 | LOADRISK.15 | LOADRISK.20 | LOADRISK.25 | LOADRISK.50 | LONGEVITY |
|---|---|---|---|---|---|---|---|---|---|---|---|
| COUNT | 9542.000000 | 9837.000000 | 10138.000000 | 10971.000000 | 11446.000000 | 11546.000000 | 12128.000000 | 12305.000000 | 12398.000000 | 12429.000000 | 14781.000000 |
| MEAN | 1.716016 | 2.206671 | 2.726908 | 3.140604 | 2.683302 | 2.353750 | 2.335202 | 1.891986 | 1.832240 | 1.487418 | 38.172451 |
| STD | 7.046603 | 8.859178 | 15.126432 | 13.262673 | 11.428072 | 9.110164 | 11.309883 | 8.520842 | 8.392986 | 6.686558 | 51.019806 |
| MIN | 0.085260 | 0.072304 | 0.072304 | 0.072304 | 0.066367 | 0.066367 | 0.063492 | 0.063492 | 0.040859 | 0.040859 | 0.000000 |
| 5% | 0.324662 | 0.308140 | 0.297872 | 0.291840 | 0.295466 | 0.288265 | 0.284349 | 0.286076 | 0.288981 | 0.274115 | 1.000000 |
| 10% | 0.385185 | 0.373567 | 0.367246 | 0.364602 | 0.359093 | 0.359649 | 0.365535 | 0.364602 | 0.364602 | 0.356481 | 2.000000 |
| 25% | 0.569231 | 0.537879 | 0.529801 | 0.548387 | 0.542857 | 0.543046 | 0.553524 | 0.557312 | 0.559524 | 0.525926 | 7.000000 |
| 50% | 0.850753 | 0.844302 | 0.843373 | 0.867925 | 0.851852 | 0.845679 | 0.865979 | 0.844869 | 0.842105 | 0.803419 | 19.000000 |
| 75% | 1.100000 | 1.086705 | 1.099034 | 1.125000 | 1.118598 | 1.106055 | 1.112409 | 1.061303 | 1.059114 | 1.012422 | 46.000000 |
| 90% | 1.636264 | 1.673077 | 1.826651 | 2.108696 | 2.428571 | 1.925253 | 2.414634 | 1.847826 | 1.705882 | 1.461538 | 102.000000 |
| 95% | 3.668831 | 5.100000 | 6.702778 | 9.500000 | 7.700000 | 5.928571 | 5.306452 | 4.456824 | 3.620690 | 2.839196 | 156.000000 |
| MAX | 165.000000 | 185.000000 | 295.000000 | 295.000000 | 295.000000 | 223.000000 | 223.000000 | 223.000000 | 223.000000 | 223.000000 | 286.000000 |

FIG. 7

PREDICTIVE ROUTING USING RISK AND LONGEVITY METRICS

TECHNICAL FIELD

The present disclosure relates generally to computer networks, and, more particularly, to predictive routing using risk and longevity metrics.

BACKGROUND

Software-defined wide area networks (SD-WANs) represent the application of software-defined networking (SDN) principles to WAN connections, such as connections to cellular networks, the Internet, and Multiprotocol Label Switching (MPLS) networks. The power of SD-WAN is the ability to provide consistent service level agreement (SLA) for important application traffic transparently across various underlying tunnels of varying transport quality and allow for seamless tunnel selection based on tunnel performance characteristics that can match application SLAs and satisfy the quality of service (QoS) requirements of the traffic (e.g., in terms of delay, jitter, packet loss, etc.).

With the recent evolution of machine learning, predictive failure detection and proactive routing in an SDN/SD-WAN now becomes possible through the use of machine learning techniques. For instance, modeling the delay, jitter, packet loss, etc. for a network path can be used to predict when that path will violate the SLA of the application and reroute the traffic, in advance. However, these forecasting models typically only operate on relatively short-term scales, often on the order of only a few hours. Consequently, the same conditions that caused traffic to be rerouted can sometimes reappear.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 7 illustrates an example table of load risks and longevity metrics;

DESCRIPTION OF EXAMPLE EMBODIMENTS

Overview

Figure 1A:
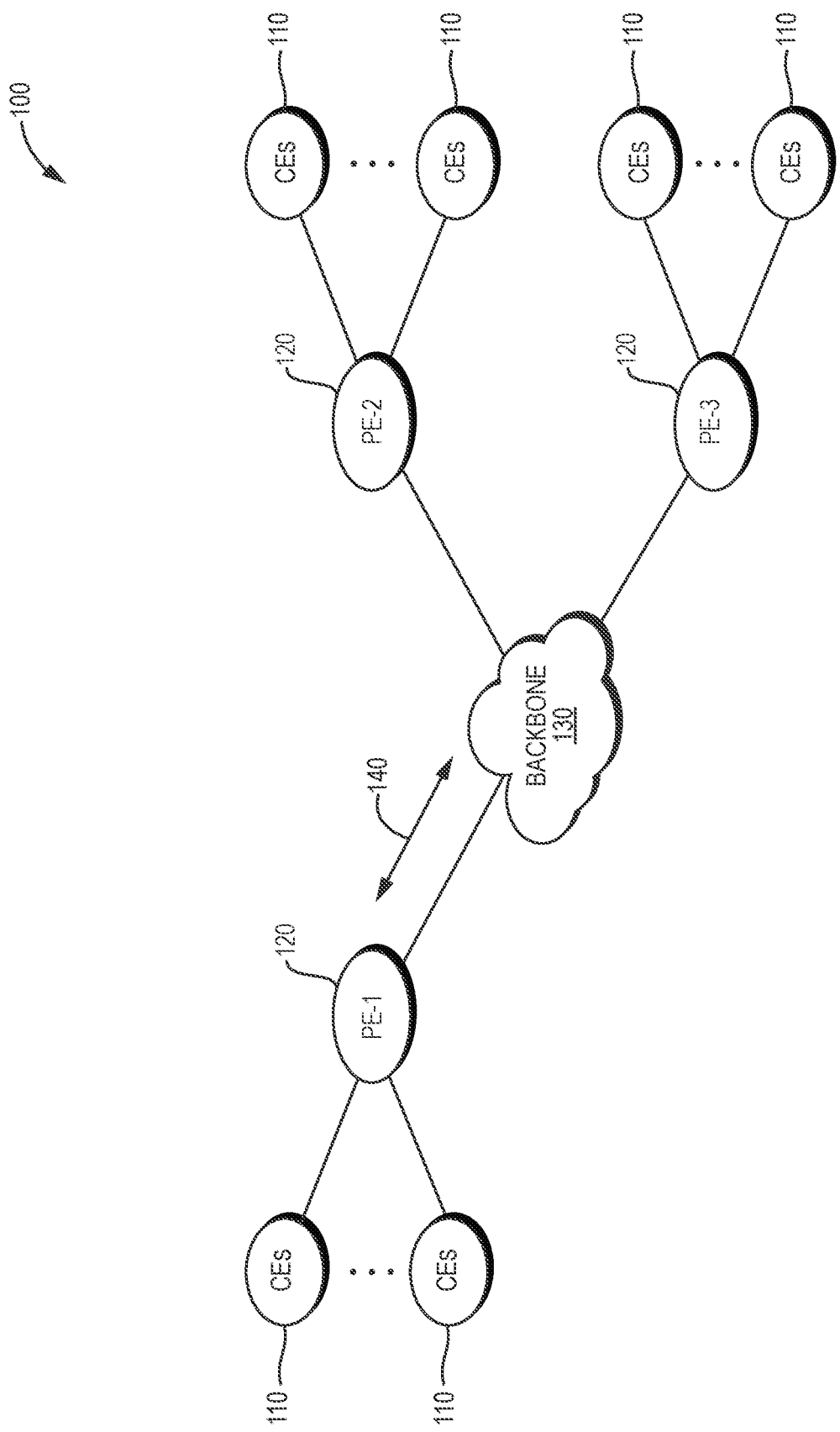
FIGS. 1A-1B illustrate an example communication network.

According to one or more embodiments of the disclosure, a device makes a prediction regarding service level agreement violations by a network transport available between a site and an online application. The device associates a risk metric with the prediction, based in part on a type of the network transport. The device computes a longevity metric for the prediction that indicates an expected validity period for the prediction. The device cause traffic to be routed between the site and the online application using the network transport, based on the prediction and its associated risk metric and its longevity metric.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
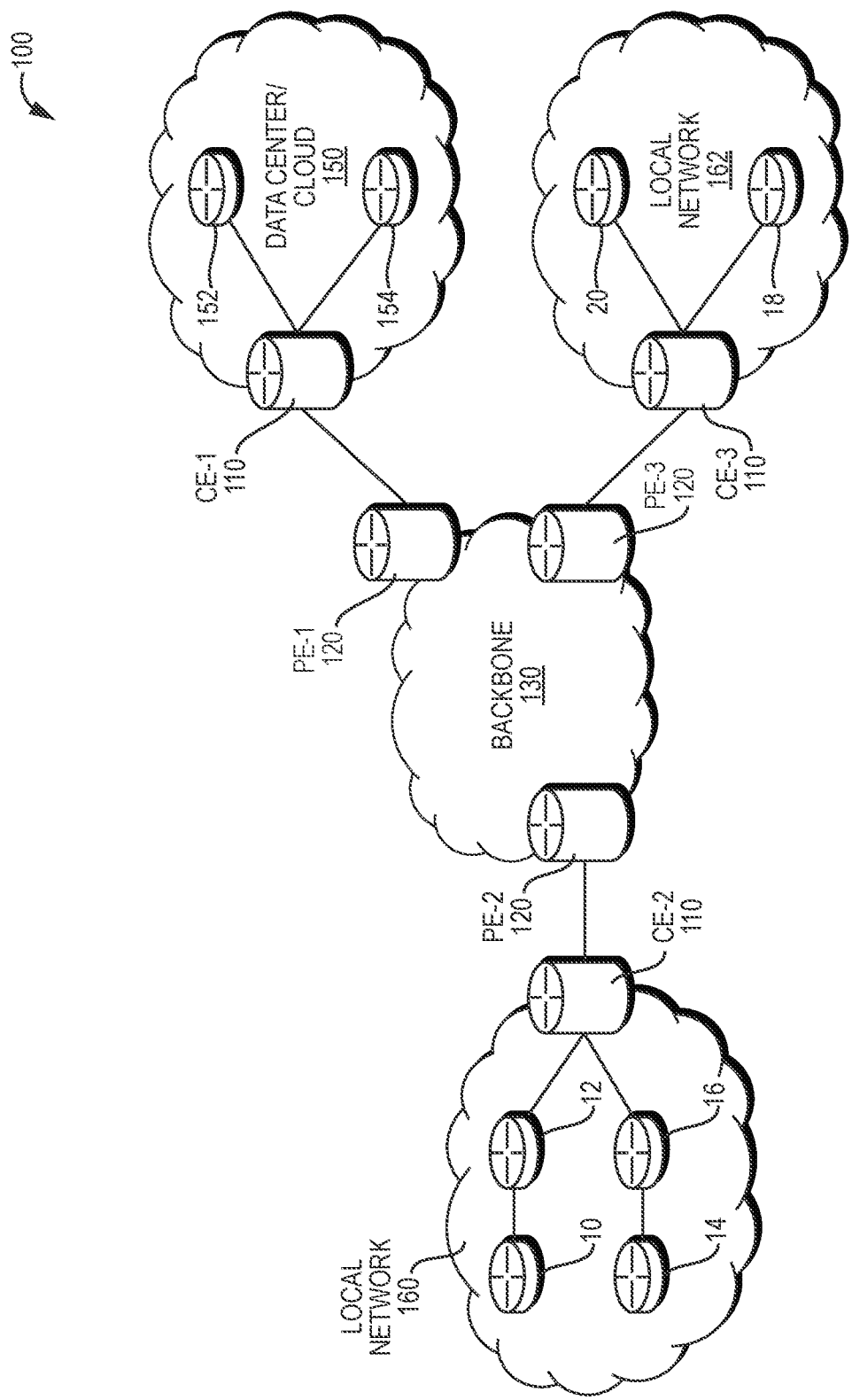

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
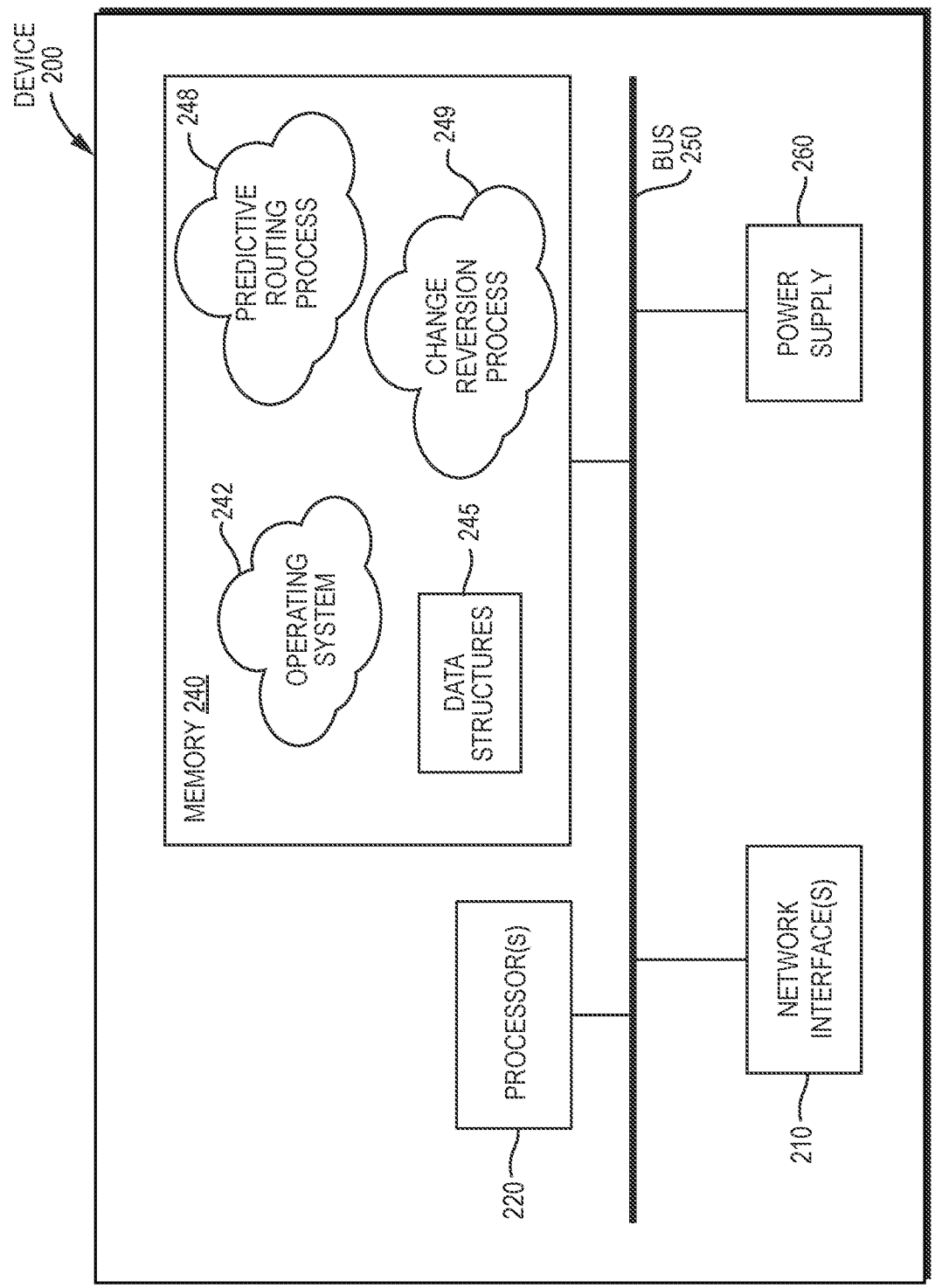
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a predictive routing process 248 and/or a change reversion process 249, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, predictive routing process 248 and/or change reversion process 249 include computer executable instructions executed by the processor 220 to perform routing functions in conjunction with one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (e.g., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc.

In various embodiments, as detailed further below, predictive routing process 248 and/or change reversion process 249 may include computer executable instructions that, when executed by processor(s) 220, cause device 200 to perform the techniques described herein. To do so, in some embodiments, predictive routing process 248 and/or change reversion process 249 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+ b*y+c and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, predictive routing process 248 and/or change reversion process 249 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of an acceptable performance or unacceptable performance. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that predictive routing process 248 and/or change reversion process 249 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for timeseries), random forest classification, or the like.

The performance of a machine learning model can be evaluated in a number of ways based on the number of true positives, false positives, true negatives, and/or false negatives of the model. For example, consider the case of a model that predicts whether the QoS of a path will satisfy the service level agreement (SLA) of the traffic on that path. In such a case, the false positives of the model may refer to the number of times the model incorrectly predicted that the QoS of a particular network path will not satisfy the SLA of the traffic on that path. Conversely, the false negatives of the model may refer to the number of times the model incorrectly predicted that the QoS of the path would be acceptable. True negatives and positives may refer to the number of times the model correctly predicted acceptable path performance or an SLA violation, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different QoS at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is performed manually by an expert, based on their experiences and/or reports on the prior performances of the applications and tunnels.

The emergence of infrastructure as a service (IaaS) and software-as-a-service (SaaS) is having a dramatic impact of the overall Internet due to the extreme virtualization of services and shift of traffic load in many large enterprises. Consequently, a branch office or a campus can trigger massive loads on the network.

Figure 3A:
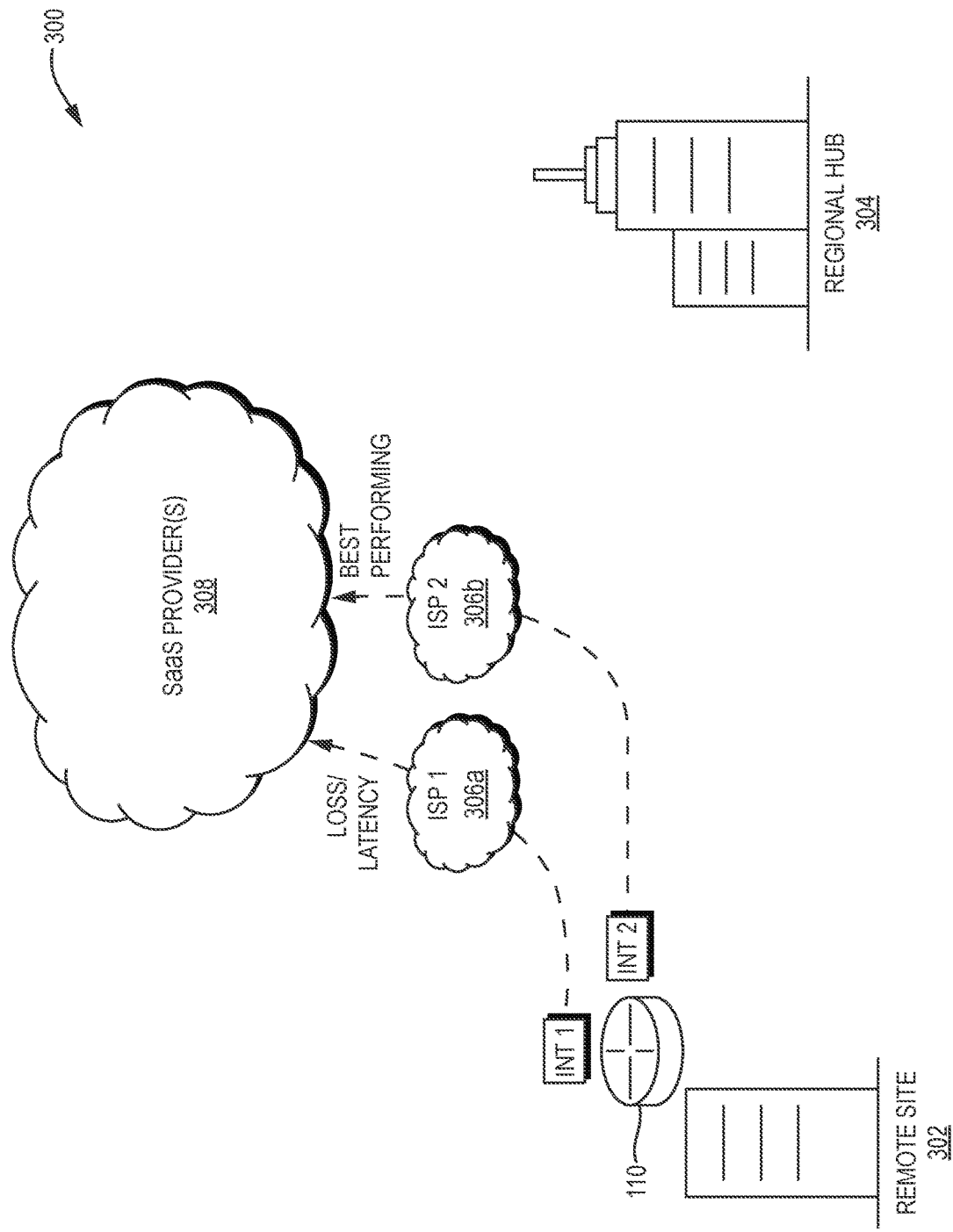
FIGS. 3A-3B illustrate example network deployments.
Figure 3B:
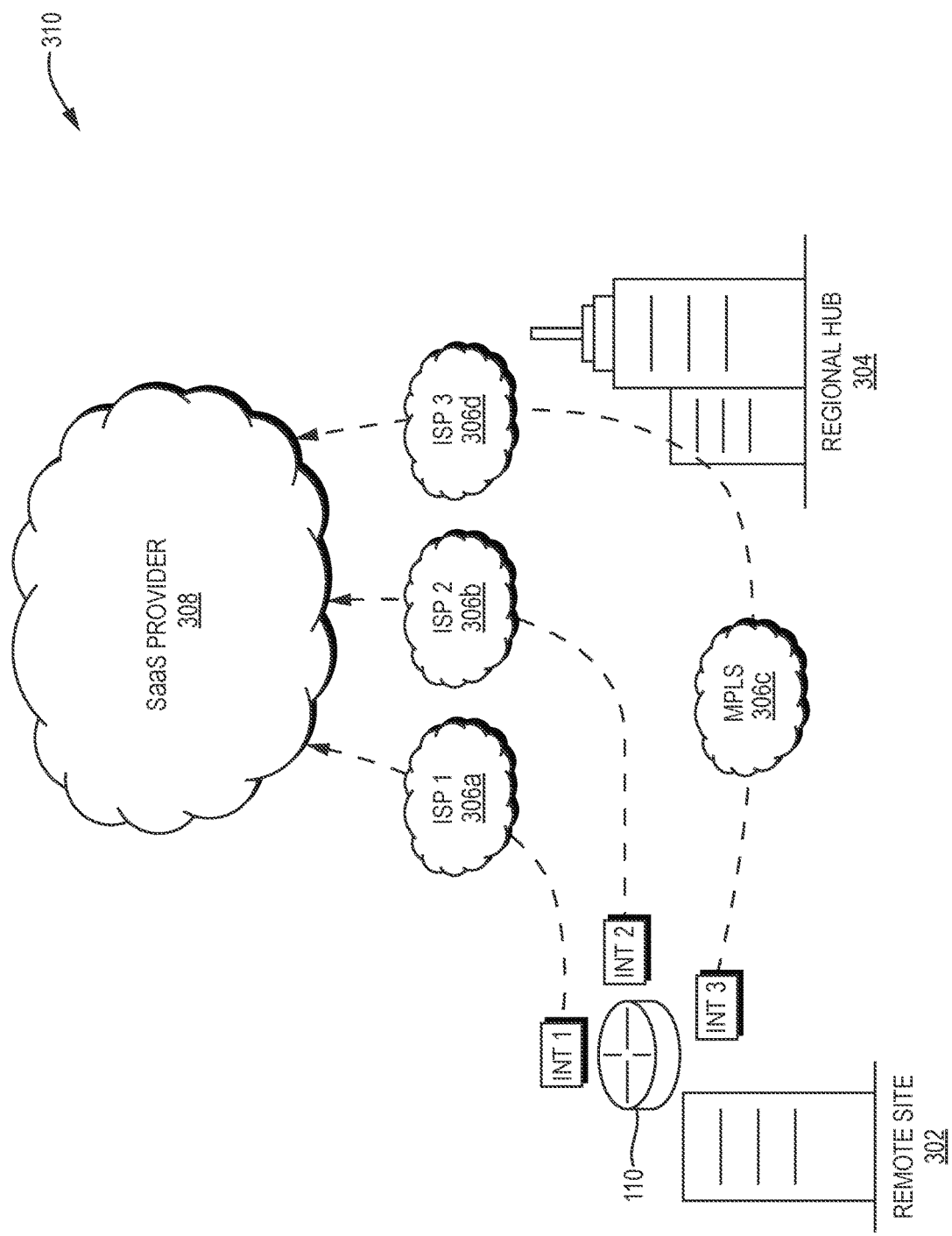

FIGS. 3A-3B illustrate example network deployments 300, 310, respectively. As shown, a router 110 located at the edge of a remote site 302 may provide connectivity between a local area network (LAN) of the remote site 302 and one or more cloud-based, SaaS providers 308. For example, in the case of an SD-WAN, router 110 may provide connectivity to SaaS provider(s) 308 via tunnels across any number of networks 306. This allows clients located in the LAN of remote site 302 to access cloud applications (e.g., Office 365™, Dropbox™, etc.) served by SaaS provider(s) 308.

As would be appreciated, SD-WANs allow for the use of a variety of different pathways between an edge device and an SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., a network interface 210, described previously), Int 1, may establish a first communication path (e.g., a tunnel) with SaaS provider(s) 308 via a first Internet Service Provider (ISP) 306a, denoted ISP 1 in FIG. 3A. Likewise, a second interface of router 110, Int 2, may establish a backhaul path with SaaS provider(s) 308 via a second ISP 306b, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306b. In contrast to the example in FIG. 3A, Int 3 of router 110 may establish a third path to SaaS provider(s) 308 via a private corporate network 306c (e.g., an MPLS network) to a private data center or regional hub 304 which, in turn, provides connectivity to SaaS provider(s) 308 via another network, such as a third ISP 306d.

Regardless of the specific connectivity configuration for the network, a variety of access technologies may be used (e.g., ADSL, 4G, 5G, etc.) in all cases, as well as various networking technologies (e.g., public Internet, MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4A:
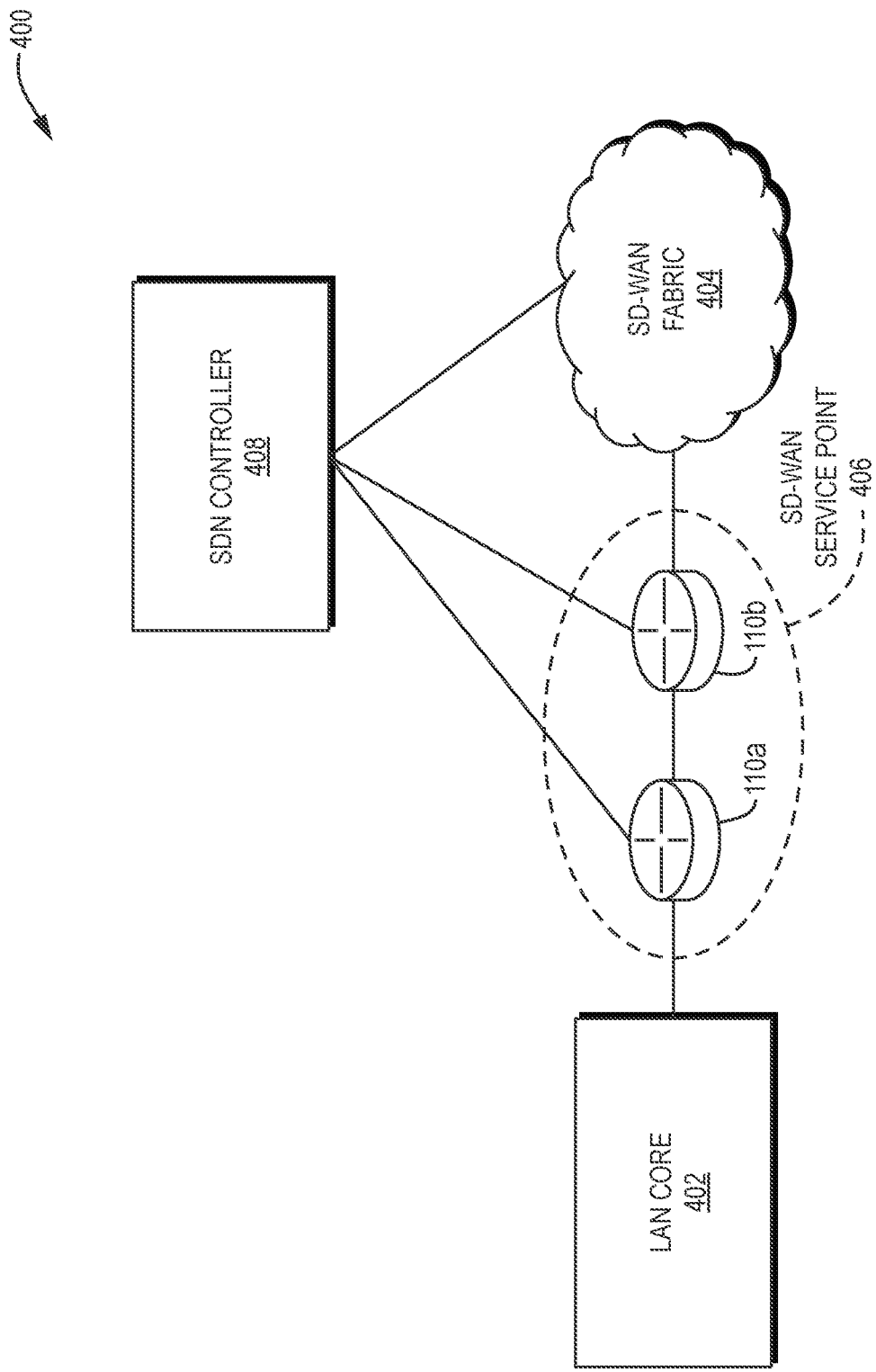
FIGS. 4A-4B illustrate example software defined network (SDN) implementations.

FIG. 4A illustrates an example SDN implementation 400, according to various embodiments. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance, SD-WAN service point 406 may comprise routers 110a-110b.

Overseeing the operations of routers 110a-110b in SD-WAN service point 406 and SD-WAN fabric 404 may be an SDN controller 408. In general, SDN controller 408 may comprise one or more devices (e.g., a device 200) configured to provide a supervisory service, typically hosted in the cloud, to SD-WAN service point 406 and SD-WAN fabric 404. For instance. SDN controller 408 may be responsible for monitoring the operations thereof, promulgating policies (e.g., security policies, etc.), installing or adjusting IPsec routes/tunnels between LAN core 402 and remote destinations such as regional hub 304 and/or SaaS provider(s) 308 in FIGS. 3A-3B, and the like.

As noted above, a primary networking goal may be to design and optimize the network to satisfy the requirements of the applications that it supports. So far, though, the two worlds of "applications" and "networking" have been fairly siloed. More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the Quality of Experience (QoE) from the standpoint of the users of the application.

More and more applications are moving to the cloud and many do so by leveraging an SaaS model. Consequently, the number of applications that became network-centric has grown approximately exponentially with the raise of SaaS applications, such as Office 365, ServiceNow, SAP, voice, and video, to mention a few. All of these applications rely heavily on private networks and the Internet, bringing their own level of dynamicity with adaptive and fast changing workloads. On the network side. SD-WAN provides a high degree of flexibility allowing for efficient configuration management using SDN controllers with the ability to benefit from a plethora of transport access (e.g., MPLS, Internet with supporting multiple CoS. LTE, satellite links, etc.), multiple classes of service and policies to reach private and public networks via multi-cloud SaaS.

Furthermore, the level of dynamicity observed in today's network has never been so high. Millions of paths across thousands of Service Provides (SPs) and a number of SaaS applications have shown that the overall QoS(s) of the network in terms of delay, packet loss, jitter, etc. drastically vary with the region, SP, access type, as well as over time with high granularity. The immediate consequence is that the environment is highly dynamic due to:

New in-house applications being deployed;
    New SaaS applications being deployed everywhere in the network, hosted by a number of different cloud providers;
    Internet, MPLS. LTE transports providing highly varying performance characteristics, across time and regions;
    SaaS applications themselves being highly dynamic: it is common to see new servers deployed in the network. DNS resolution allows the network for being informed of a new server deployed in the network leading to a new destination and a potentially shift of traffic towards a new destination without being even noticed.

According to various embodiments, application aware routing usually refers to the ability to rout traffic so as to satisfy the requirements of the application, as opposed to exclusively relying on the (constrained) shortest path to reach a destination IP address. Various attempts have been made to extend the notion of routing, CSPF, link state routing protocols (ISIS, OSPF, etc.) using various metrics (e.g., Multi-topology Routing) where each metric would reflect a different path attribute (e.g., delay, loss, latency, etc.), but each time with a static metric. At best, current approaches rely on SLA templates specifying the application requirements so as for a given path (e.g., a tunnel) to be "eligible" to carry traffic for the application. In turn, application SLAs are checked using regular probing. Other solutions compute a metric reflecting a particular network characteristic (e.g., delay, throughput, etc.) and then selecting the supposed 'best path,' according to the metric.

The term 'SLA failure' refers to a situation in which the SLA for a given application, often expressed as a function of delay, loss, or jitter, is not satisfied by the current network path for the traffic of a given application. This leads to poor QoE from the standpoint of the users of the application. Modern SaaS solutions like Viptela, CloudonRamp SaaS, and the like, allow for the computation of per application QoE by sending HyperText Transfer Protocol (HTTP) probes along various paths from a branch office and then route the application's traffic along a path having the best QoE for the application. At a first sight, such an approach may solve many problems. Unfortunately, though, there are several shortcomings to this approach:

The SLA for the application is 'guessed.' using static thresholds.

Routing is still entirely reactive: decisions are made using probes that reflect the status of a path at a given time, in contrast with the notion of an informed decision.

SLA failures are very common in the Internet and a good proportion of them could be avoided (e.g., using an alternate path), if predicted in advance.

Figure 4B:
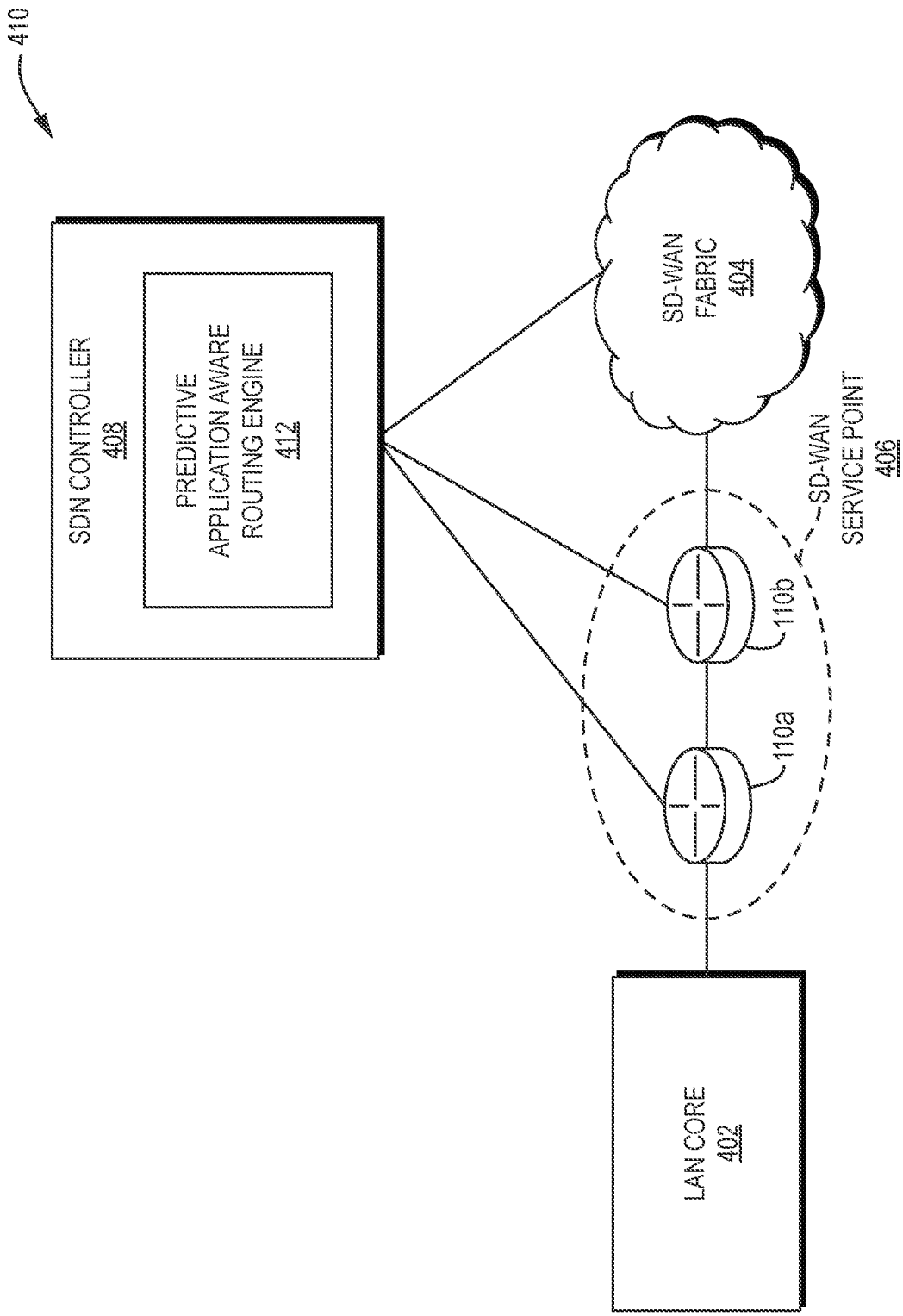

In various embodiments, the techniques herein allow for a predictive application aware routing engine to be deployed, such as in the cloud, to control routing decisions in a network. For instance, the predictive application aware routing engine may be implemented as part of an SDN controller (e.g., SDN controller 408) or other supervisory service, or may operate in conjunction therewith. For instance, FIG. 4B illustrates an example 410 in which SDN controller 408 includes a predictive application aware routing engine 412 (e.g., through execution of predictive routing process 248). Further embodiments provide for predictive application aware routing engine 412 to be hosted on a router 110 or at any other location in the network.

During execution, predictive application aware routing engine 412 makes use of a high volume of network and application telemetry (e.g., from routers 110a-110b. SD-WAN fabric 404, etc.) so as to compute statistical and/or machine learning models to control the network with the objective of optimizing the application experience and reducing potential down times. To that end, predictive application aware routing engine 412 may compute a variety of models to understand application requirements, and predictably route traffic over private networks and/or the Internet, thus optimizing the application experience while drastically reducing SLA failures and downtimes.

In other words, predictive application aware routing engine 412 may first predict SLA violations in the network that could affect the QoE of an application (e.g., due to spikes of packet loss or delay, sudden decreases in bandwidth, etc.). In other words, predictive application aware routing engine 412 may use SLA violations as a proxy for actual QoE information (e.g., ratings by users of an online application regarding their perception of the application), unless such QoE information is available from the provider of the online application (e.g., via an API, etc.). In turn, predictive application aware routing engine 412 may implement a corrective measure, such as rerouting the traffic of the application, prior to the predicted SLA violation. For instance, in the case of video applications, it now becomes possible to maximize throughput at any given time, which is of utmost importance to maximize the QoE of the video application. Optimized throughput can then be used as a service triggering the routing decision for specific application requiring highest throughput, in one embodiment. In general, routing configuration changes are also referred to herein as routing "patches," which are typically temporary in nature (e.g., active for a specified period of time) and may also be application-specific (e.g., for traffic of one or more specified applications).

As noted above, predictions made by a predictive routing engine are typically short-term in nature (e.g., on the order of only a few hours). However, another set of predictions that predictive application aware routing engine 412 may make are Long Term Predictions (LTPs). In contrast with short term predictions, an LTP considers the path history, to determine whether a better policy could have been applied, leading to optimizing the application experience. For example, predictive application aware routing engine 412 may detect that voice traffic is configured to use a specific tunnel color in a given region although another color could have been used while providing better SLA.

In other words, LTPs can be used to implement long-term changes to the network, either automatically or through the intervention of an administrator (e.g., by recommending a change to the administrator, by requiring administrator approval before implementing, etc.), which are often made on a permanent basis. As these changes are long-lived, it is important that their corresponding LTPs remain accurate and valid throughout their prediction period, meaning that a mechanism should be in place to filter out LTPs that are questionable from being implemented as long-term changes.

Over time, a large enterprise network may accumulate dozens of such long-term changes applied to different application classes, sites, devices, transports, etc. These changes, just like any other attempt by the network operator to optimize the network for user experience, should also be validated over the course of several days, weeks, or even months, to ensure that the LTPs from predictive application aware routing engine 412 remain valid. Indeed, changes in the underlying network dynamics can often lead to LTPs becoming invalid over time, meaning that their corresponding changes to the network should be reverted.

Predictive Routing Using Risk and Longevity Metrics

The techniques herein introduce mechanisms to make long term predictions (LTPs) and select the optimal network changes based on the LTPs, based on risk and longevity metrics for the LTPs. In some aspects, the system may perform analysis on historical data, to determine whether better routing policies (e.g., those with fewer SLA violations) could have been used in the past, to drive its LTPs. In further aspects, various filters may be applied to the list of LTPs that take into account the reliability of the potential preferred candidates, the past observed traffic load on the preferred candidates, along with the probability of SLA violation (e.g., should additional traffic be redirected onto such paths). This allows the system to optimize the LTP-driven changes to the network. In further aspects, the techniques herein also introduce mechanisms to track the performance of the LTP-driven network changes and revert them, when and if they become detrimental to the user experience.

Illustratively, the techniques described herein may be performed by hardware, software, and/or firmware, such as in accordance with predictive routing process 248, is which may include computer executable instructions executed by the processor 220 (or independent processor of interfaces 210) to perform functions relating to the techniques described herein, such as in conjunction with the operation of change reversion process 249.

Specifically, according to various embodiments, a device makes a prediction regarding service level agreement violations by a network transport available between a site and an online application. The device associates a risk metric with the prediction, based in part on a type of the network transport. The device computes a longevity metric for the prediction that indicates an expected validity period for the prediction. The device cause traffic to be routed between the site and the online application using the network transport, based on the prediction and its associated risk metric and its longevity metric.

Figure 5:
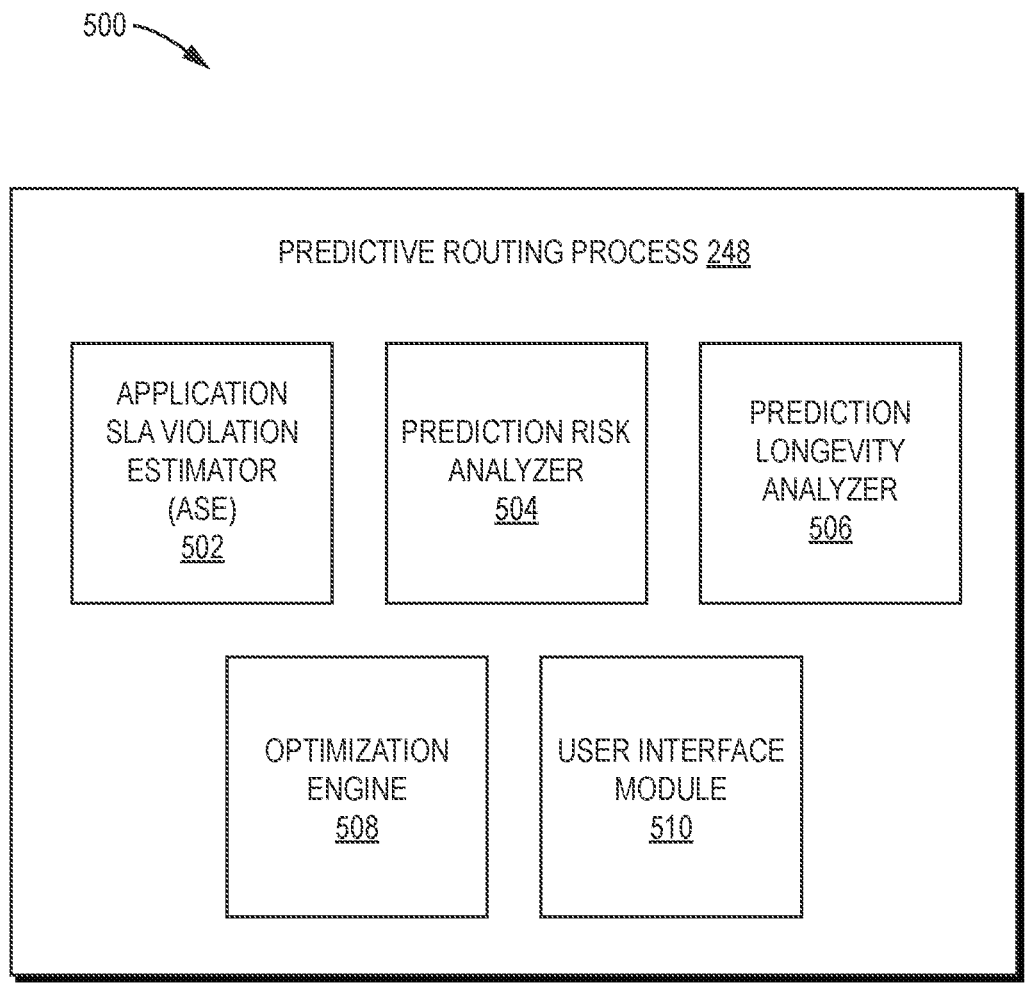
FIG. 5 illustrates an example architecture for a predictive routing process.

Operationally, FIG. 5 illustrates an example architecture 500 for a predictive routing process, according to various embodiments. At the core of architecture 500 is predictive routing process 248, which may be executed by a controller for a network or another device in communication therewith. For instance, predictive routing process 248 may be executed by a controller for a network (e.g., SDN controller 408 in FIGS. 4A-4B), a particular networking device in the network (e.g., a router, etc.), another device or service in communication therewith, or the like. In some embodiments, for instance, predictive routing process 248 may be used to implement a predictive application aware routing engine, such as predictive application aware routing engine 412, or another supervisory service for the network.

As shown, predictive routing process 248 may include any or all of the following components: an application SLA violation estimator (ASE) 502, prediction risk analyzer 504, a prediction longevity analyzer 506, an optimization engine 508, and/or a user interface module 510. As would be appreciated, the functionalities of these components may be combined or omitted, as desired. In addition, these components may be implemented on a singular device or in a distributed manner, in which case the combination of executing devices can be viewed as their own singular device for purposes of executing predictive routing process 248.

During execution, ASE 502 may be responsible for evaluating and predicting, for all edge devices, the number of SLA violations along the various paths and transports available between an edge device and an online application. For instance, these violations may be quantified as the amount of time the application traffic violated the SLA for the application. These types of failures are also sometimes referred to as "application failures" or "gray failures." To do so, ASE 502 may rely on any or all of the following information, which ASE 502 may obtain:

Router configuration information—this may also include a description of the topologies in the network Flow telemetry on a per application basis and per path basis. This can be captured, for instance, using deep packet inspection (DPI) or other flow telemetry collection mechanism.

Various network-centric performance metrics such as delay, loss, and jitter. For instance, in the case of an SD-WAN, this information can be collected according to the local configuration over overlay tunnels with BFD and Cloud-on-Ramp (HTTP) probes over DIA (Direct Internet Access) interfaces.

For each network transport (e.g., TLOC) T1 available to the router/edge device, ASE 502 may also identify and evaluate any alternate network transports T2, . . . , Tn, in order to determine what the SLA violations would have occurred, should any or all of the alternate available network transport T2, . . . , Tn had been used to convey the application traffic. In a simple embodiment, ASE 502 may evaluate the SLA on alternate transport T2, . . . , Tn using historical probing data for such path. In a more sophisticated embodiment, ASE 502 may perform "what-if" modeling, to simulate the SLA other T2, . . . , Tn, should an additional load from T1 be added.

At this point, ASE 502 may select a preferred network transport, based on a computed gain (e.g., the difference in SLA violations among the transports).

Figure 6A:
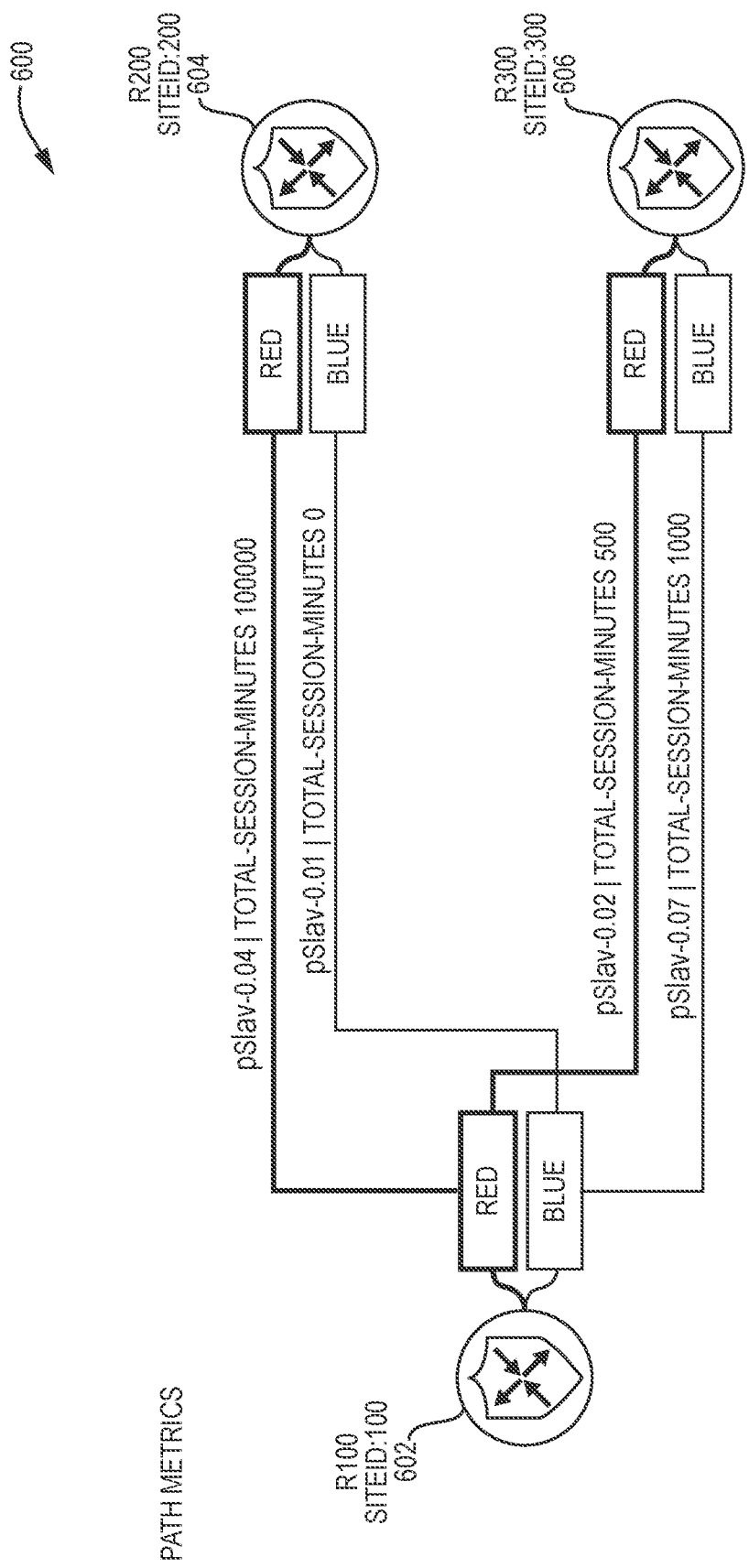
FIGS. 6A-6B illustrate examples of evaluating what-if routing scenarios.
Figure 6B:
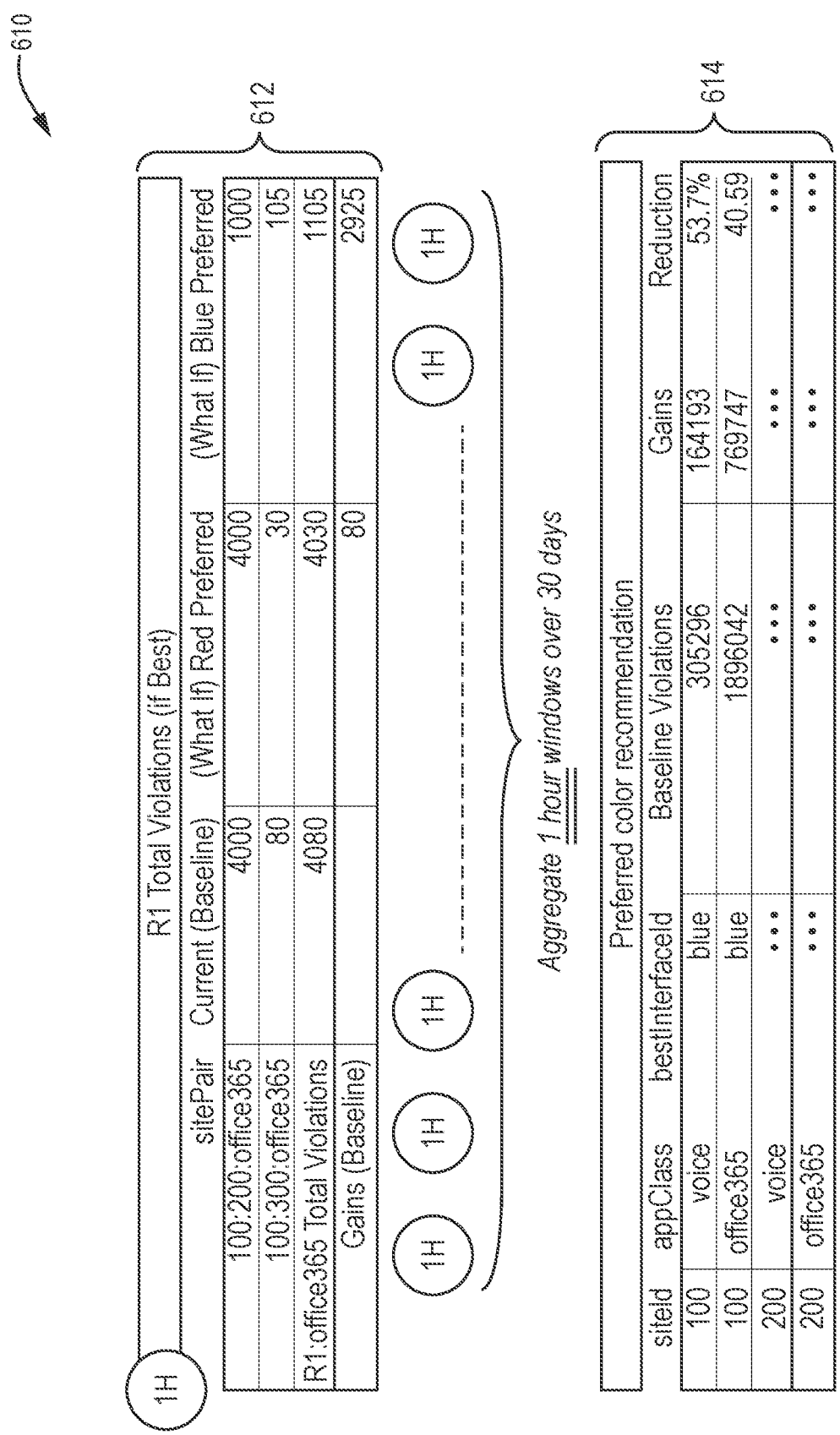

FIGS. 6A-6B illustrate examples of evaluating what-if routing scenarios, according to various embodiments. As shown in FIG. 6A, assume that a network 600 includes sites/edge routers 602-606. Between router 602 and router 604 may be multiple network transports available. In some instances, each transport may be assigned a different color, to allow a network administrator to easily distinguish between them. Similarly, there may also be multiple network transports available between router 602 and router 606.

FIG. 6B illustrates an example of ASE 502 evaluating what-if scenarios for the different transports in FIG. 6A. More specifically, ASE 502 may compute the predicted total amount of SLA violations 612, on a per-application basis, were traffic to be routed using the different transport options. From this, ASE 502 may aggregate the predicted SLA violations 612, to identify the best predicted transport in terms of gains over the current configuration. Here, it can be seen that using certain transports/interfaces for certain applications are predicted to reduce the SLA violations considerably. For instance, router 602 routing voice traffic using its 'blue' transport could reduce the SLA violations for the voice traffic by 53.7%. Similarly, router 602 routing Office365 traffic using its 'blue' transport could reduce its SLA violations by 40.59%.

Referring again to FIG. 5, one challenge in simply implementing a long-term change in the network to use the 'best' predicted transport for a certain application is that different types of transports offer differing degrees of reliability and determinism. For the sake of illustration, consider the case of MPLS and a 'bronze' tier Internet service being possible transports for a given site. Although overbookings are applied (mostly at the edge) in the Service Provider (SP) network, the overbooking ratios are not similar between these two types of transports, which unavoidably leads to more deterministic SLA on MPLS transports. Thus, a naïve decision consisting in suggesting a preferred less reliable transport increases the chance of making a 'risky' recommendation or change to the network, based on the underlying LTP.

In various embodiments, prediction risk analyzer 504 be configured to associate risk metrics with the LTPs from ASE 502, to represent the risk of an LTP becoming unreliable or invalid, based on the type of transport associated with that LTP. In one embodiment, this can be done through the configuration of discrete risk levels for the different types of transports available. For instance, a user may configure the following risk levels, based on their past experience:

Low-risk (level=1): metro-ethernet, mpls, private1, private2, private3, private4, private5, and private6.

Medium-risk (level=2): biz-internet, blue, bronze, custom1, custom2, custom3, default, gold, green, public-internet, red, silver.

High-risk (level=3): 3G, 4G, 5G, LTE.

In other words, a cellular transport may be deemed a 'high' risk of its SLA predictions not holding true, due to the nature of cellular connections. Conversely, transports such as MPLS, metropolitan Ethernet (metro-ethernet), etc., may be deemed as being of low risk, due to their natures.

Using the above, prediction risk analyzer 504 may compute the risk-delta=target level−min(source levels), where target level is the risk factor for the alternate transport, and source level is that of the source transport.

In another embodiment, prediction risk analyzer 504 may compute the risk-delta automatically, using historical data. For example, various metrics could be used, such as the path entropy, probability of SLA violation given an SLA template, etc., from which a risk-level could be computed as a function of those metrics. For instance, the risk-level can be defined as the difference in fluctuation of the probability of SLA violation (measured by metrics entropy or standard deviation) between the target and source.

Prediction risk analyzer 504 may then use the risk factors to filter out LTPs with a risk greater than a threshold (e.g., a minimum risk delta), which may be a user configurable parameter.

Prediction risk analyzer 504 may also be used to add robustness to a given LTP by considering the history of the preferred transport in terms of traffic load and probability of SLA violation, in one embodiment. Indeed, one of major risks when selecting a preferred transport Tj for Ti is the probability of satisfying the SLA after adding the traffic from Ti to Tj. This is where prediction risk analyzer 504 may attempt to reduce the risk, such as by using the following approach:

Find the maximum number of session minutes experienced on all candidates transport T during the past X months with no more than some maximum prob SLAV p≥maxLTSessionMinutes:p.

The load-risk loadRisk:p is the ratio between the total expected session-minutes (a proxy value for the load) after switching to the recommended transport and the maxLTSessionMinutes:p.

Then, filtering can be applied using the following rules:
loadRisk:p<1, the candidate transport should be able to tolerate the new load with no more than p violations.

loadRisk:p>1, the candidate transport has not been observed to be able to tolerate such a load, meaning that there is a risk of higher violations.

In one embodiment, the value for p may be user-defined (e.g., via user interface module 510).

The effect of applying such rule is to reduce the number of LTPs under consideration.

Predictive routing process 248 may also include prediction longevity analyzer 506, which relies on the concept of longevity introduced herein. More specifically, the 'longevity' of an LTP generally refers to the amount of time that the prediction is expected to stay valid. In various embodiments, prediction longevity analyzer 506 may use the longevity metrics for the LTPs to filter out those from consideration that are below a certain threshold, which may be user-defined (e.g., via user interface module 510).

For example, FIG. 7 illustrates an example table 700 of load risks and longevity metrics, according to various embodiments. More specifically, table 700 shows various statistics computed using a prototype implementing the techniques herein. From this, different thresholds may be set, to filter out LTPs that are deemed too 'risky' or do not exhibit sufficient longevity. For instance, a user may opt to set a risk threshold somewhere in the range of the $50^{th}$ and $75^{th}$ percentiles, shown in area 720.

Note that the filters related to risk and load can also have a direct impact on the longevity. Indeed, as can be seen in table 700, although the risk and load factors allow for the filtering out of LTPs that are not sufficiently robust (e.g., their overall risk is considered too high), they also select LTPs with higher longevity. Accordingly, in some embodiments, a tradeoff may be made between the risk and longevity metrics for purposes of filtering out LTPs.

Figure 8:
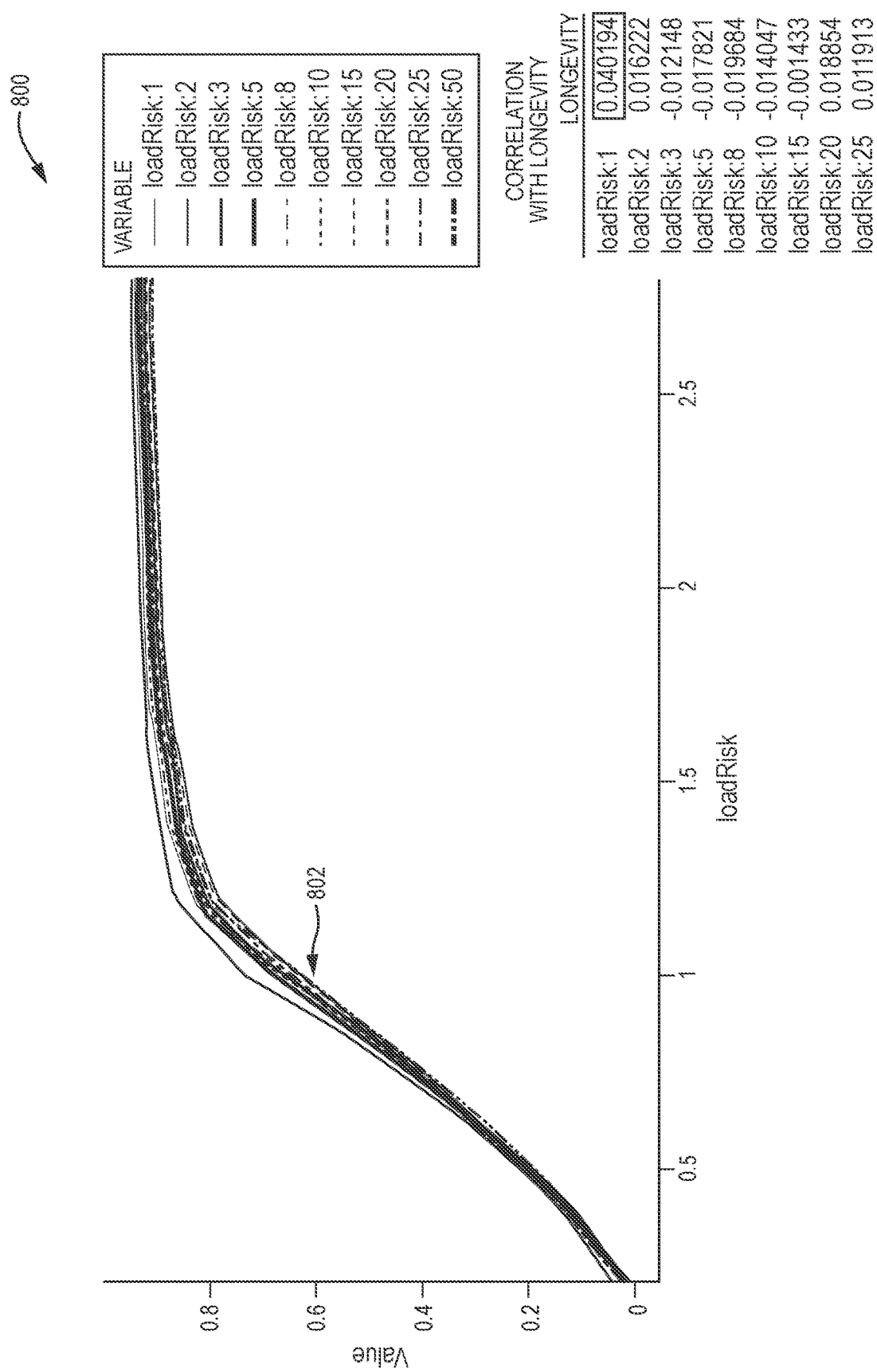
FIG. 8 illustrates an example plot showing the impact of load risk on longevity.

FIG. 8 illustrates an example plot 800 showing the impact of load risk on longevity, according to various embodiments. More specifically, plot 800 shows the cumulative fraction of instances per probability of SLA violation thresholds for different load risks. The correlations between these load risks and longevity are also shown. Here, it can be seen that a reasonable portion of LTP's can be used to drive long-term changes in the network can be utilized, while still limiting the risks, such as by using a threshold cutoff around location 802 on plot 800.

Further information computed from the prototype system are as follows:

Counts of deltas per instance:

TABLE 1

| color | RiskDelta | count |
|---|---|---|
| 0 | 0 | 13212 |
| 1 | 1 | 1621 |

Average longevity and counts per source and target (per instance):

TABLE 2

| Color | RiskDelta | sourceRiskLevel | targetRiskLevel | Count | Avg. Longevity |
|---|---|---|---|---|---|
| 0 | 0 | 1 | 1 | 9909 | 40.024523 |
| 1 | 0 | 2 | 2 | 3261 | 42.500767 |
| 2 | 1 | 1 | 2 | 1611 | 18.019243 |

Average longevity and counts per target interface:

TABLE 3

| bestInterfaceID | Count | Average Longevity |
|---|---|---|
| Private2 | 1131 | 24.061008 |
| Public-internet | 1321 | 72.309614 |
| Biz-internet | 1856 | 23.661638 |
| Private1 | 4786 | 66.116799 |

Figures 9A, 9B:
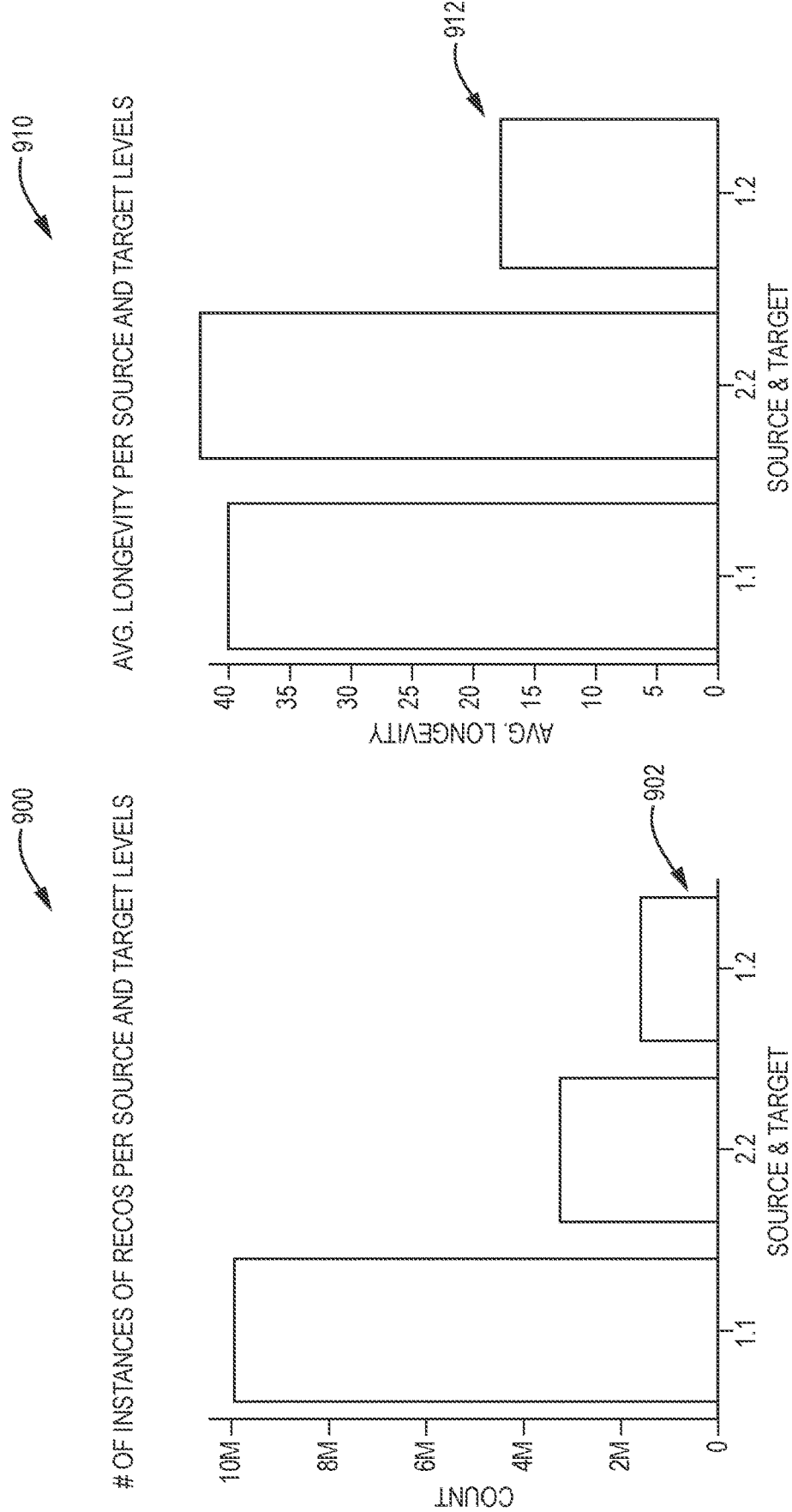
FIGS. 9A-9B illustrate plots showing the impact of risks on longevity.

FIGS. 9A-9B illustrate plots showing the impact of risks on longevity, based on the above. More specifically, FIG. 9A shows a histogram plot 900 of the number of instances of LTP-based recommendations per source and target levels. Here, it can be seen from histogram 902 that few have a high risk (>0), which can be eliminated with no major loss. Likewise, FIG. 9B illustrates an example histogram plot 910 showing the average longevity per source and target levels. At 912, it can be seen that higher risk LTP-based recommendations can be removed, increase the average longevity.

Referring again to FIG. 5, predictive routing process 248 may further include optimization engine 508, which seeks to globally optimize all of the parameters previously mentioned with loss tuned to increase longevity while reducing the risk of an incorrect LTP (leading to an incorrect recommendation and/or network change).

In one embodiment, the optimization problem solved by optimization engine 508 may be formulated as follows, allowing optimization engine 508 to identify the 'best' solution from the search space:
Maximize longevity
Such that longevity>30 days
load-risk:p<load-risk-threshold; for all p in {1, 2, 3, . . . , n}

Since the various parameters can be computed from data (e.g., load-risk:p), a space-search algorithm such as grid-search or random-search algorithms can be used to find the best configuration that minimizes the objective function. In other instances, the objective function can be changed to other suitable functions or other constraints can be added (e.g., risk-delta<1).

Finally, predictive routing process 248 may also include user interface module 510, which is generally operable to provide data to a user interface for display to a user and receive commands from that user. In some embodiments, user interface module 510 may provide recommendations for display based on the best/optimal LTPs identified by optimization engine 508. In turn, the user may elect to implement those recommended changes in the network, such as by routing certain application traffic via a particular transport. Of course, such recommendations may also be implemented, automatically, as well.

In some embodiments, user interface module 510 may receive feedback from a user regarding an LTP/recommendation. After collecting a series of feedback, user interface module 510 may determine whether there is any correlation between any negative feedback and the LTP longevity. To that end, user interface module 510 may employ a simple logistic regression to automatically filter out LTPs/recommendations, to exhibit a satisfactory probability of the user being satisfied with the recommendations. Such a logistic regression may use a number of parameters as input features such as the longevity, risk factor, and potential gains, to mention a few.

While the above techniques can aid a predictive routing system in ensuring that its LTPs that are used to drive routing changes remain valid for a long period of time, there are still instances in which an LTP may become invalid before the end of its associated longevity metric. This can be due to a number of conditions such as incorrect predictions, changes in the network, or the like. To this end, predictive routing process 248 may operate in conjunction with change reversion process 249, in some embodiments.

Figure 10:
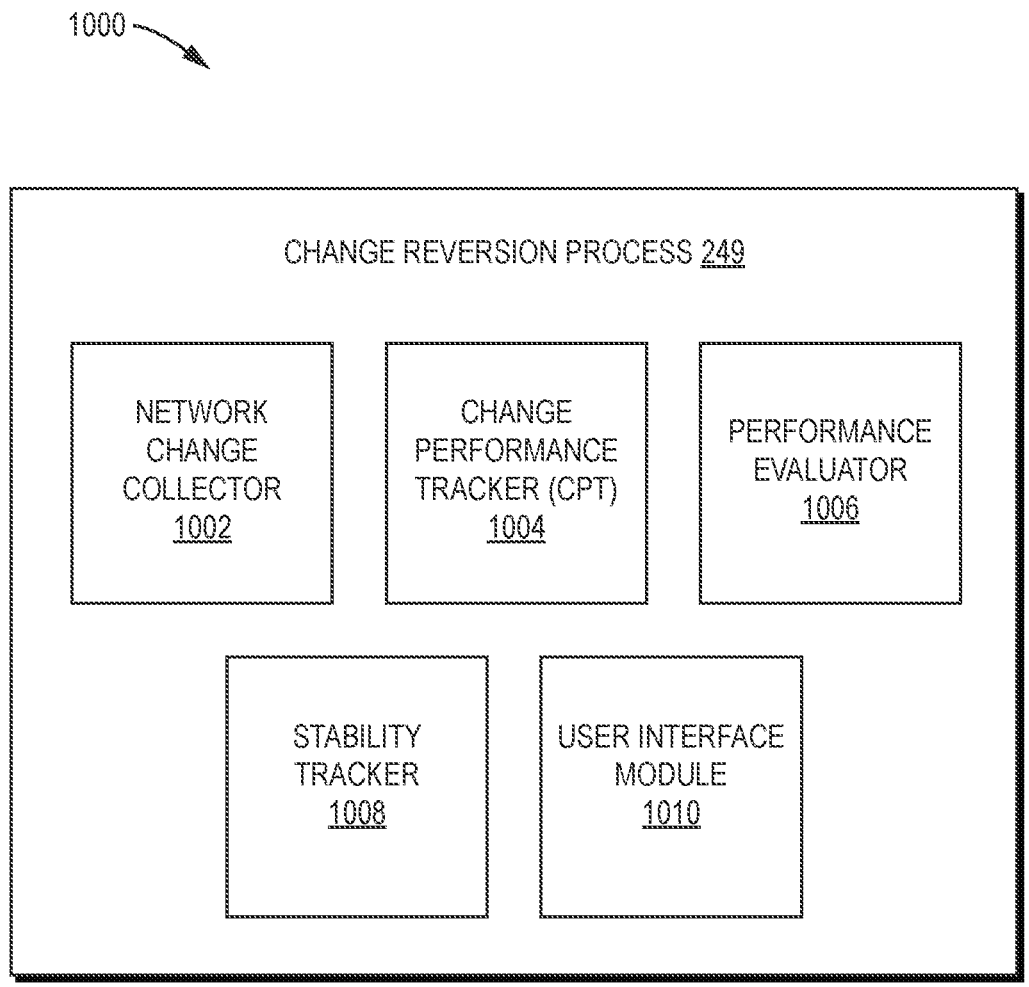
FIG. 10 illustrates an example architecture for reverting long-term changes.

FIG. 10 illustrates an example architecture 1000 for reverting long-term changes, according to various embodiments. At the core of architecture 1000 is change reversion process 249, which may be executed by a controller for a network or another device in communication therewith. For instance, change reversion process 249 may be executed by a controller for a network (e.g., SDN controller 408 in FIGS. 4A-4B), a particular networking device in the network (e.g., a router, etc.), another device or service in communication therewith, or the like. In some embodiments, for instance, change reversion process 249 may be used to implement a predictive application aware routing engine, in part, such as predictive application aware routing engine 412, or another supervisory service for the network.

As shown, change reversion process 249 may include any or all of the following components: a network change collector 1002, a change performance tracker (CPT) 1004, a performance evaluator 1006, a stability tracker 1008, and/or a user interface module 1010. As would be appreciated, the functionalities of these components may be combined or omitted, as desired (e.g., integrated into predictive routing process 248). In addition, these components may be implemented on a singular device or in a distributed manner, in which case the combination of executing devices can be viewed as their own singular device for purposes of executing change reversion process 249.

Network change collector 1002 may be responsible for collecting network changes, such as via an API, protocol extension for a third-party service, or any other source of information regarding change recommendations or implemented changes for the network. In some embodiments, the change information collected by network change collector 1002 may also include information provided by a network operator or administrator, which can be collected either via an API or user interface (e.g., via user interface module 1010). Such an API (RESTful or otherwise) allows the data source to notify network change collector 1002 that a change has been performed. For instance, the following could be used:

```
POST /change
{
"pathsBefore": ["path1", "path2"]
"pathsAfter": ["path1"],
"app": "voice",
"expectedImprovement": 0.9
// other metadata of interest (e.g., target metric, etc.)
}
```

The above snippet shows an example of a payload sent to the API, which describes a routing change for a given application (e.g., voice), which used to be routed over path1 and path2, and will be now routed only over path2, with an expected improvement of 90% in application experience.

In another embodiment, network change collector 1002 may collect information regarding any configuration change to the network, not just to routing changes. An example payload sent to the API to do so may look as follows:

```
POST /change
{
"app": "voice"
"configBefore": [X],
"configAfter": [Y],
// other metadata of interest (e.g., target metric, etc.)
}
```

Of course, the information collected by network change collector 1002 can take various forms, in addition to the above. For instance, an online application can be expressed as a list of NBAR2 identifiers, as a set of destinations, as a list of server port numbers, etc. In addition, the expected improvement for any change may be expressed as an absolute improvement in user ratings (e.g., the change should increase the average over the WebEx user experience ratings by 0.4 points).

On receipt of the change information for the network, network change collector 1002 may use it to populate a database (e.g., a relational database), either locally or remotely, for use by the other components of change reversion process 249.

In various embodiments, change reversion process 249 may also include change performance tracker (CPT) 1004, whose role is to process telemetry relevant to any change stored in the change database of network change collector 1002 and compute the live performance of a given change. CPT 1004 may consume two types of telemetry: 1.) traffic information on the paths selected prior to the change and after the change (e.g., NetFlow records), 2.) application experience statistics of traffic routed over these paths (QoS metrics, application labels, etc.).

In one embodiment, CPT 1004 may selectively enable the data collection of NetFlow records and application experience statistics on the paths. In any case, CPT 1004 may consume a live stream of such records as well as some history of these data to measure whether the change has a positive impact on user experience.

In various embodiments, CPT 1004 may use either of two strategies:
1.) When QoS metrics are available and are considered as a reliable proxy of user experience (which is not always the case), CPT 1004 may compare the would-be performance of the application on the paths in pathsBefore and pathsAfter. This assumes, of course, that the QoS would remain identical, whether traffic is routed over the path of interest. The advantage of this approach is that it allows CPT 1004 to track the performance over time of both scenarios, simultaneously. It also allows CPT 1004 to detect situations where the quality of the user experience changes significantly in one or both scenarios, thus providing deep visibility to the end-user.
2.) When QoS metrics are not available or not reliable, and CPT 1004 relies on direct application feedback, CPT 1004 may only compute the performance of a configuration change by performing a before/after comparison of the user experience. In this case, CPT 1004 may use a statistically significant sample of the experience prior to the change, and continuously monitors the experience after the change. Additionally, the prior sample may be processed using statistical and/or machine learning techniques, to control for other variables which may change over time. For example, videoconference calls from some branch offices might now go over a longer average distance, if the collaboration patterns have changed after a recent corporate reorganization. This would lead to longer mean lag times and lower average user ratings of the videoconferencing application, even when the underlying network quality remains unchanged. Given the large historical records that the associated predictive routing engine has access to, the influence of drift in such external variables on the mean user experience can be quantified and corrected for by CPT 1004.

Change reversion process 249 may also include performance evaluator 1006, which continuously ingests the performance metrics produced by CPT 1004 for every change and detects situations whereby a change either: 1.) hurts the user performance or 2.) does not live up to its promise given by the expected improvement information in the database of network change collector 1002 associated with a given change. Depending on the user configuration, change reversion process 249 may react differently to such conditions, with actions ranging from an automated reversion of the change, to notifying a user or network administrator, or the like. These actions may also be configured as part of the metadata of the change submitted via the API associated with network change collector 1002. A broad variety of configuration parameters can be included as part of these metadata, such as parameters controlling the notification mechanism (e.g., email, text message, ticketing system), specifying the range of performance degradations that should lead to various actions (e.g., notification vs. reversion, etc.), or the like.

Change reversion process 249 may also include stability tracker 1008, in some embodiments, which is used to determine whether assessments can indeed be made related to a particular network change. Indeed, an LTP-driven change, or even any manual change made by a user, is made at a point in time with a given state of the network and traffic condition. Even if a change is made to the network and is valid at that point in time, the conditions or traffic pattern may change (e.g., addition of transports, hardware or software upgrade, change of connectivity, high degradation of the network conditions, sudden increase of traffic, traffic matrix change due to application moving in the cloud), then the change (and associated LTP) may be no longer be valid. This type of invalidity is not a reflection on the quality of the prediction/LTP, but simply because network conditions have changed. Although this seems to be highly subtle (in the end, the change is invalid), there is a considerable difference for the user assessing the quality of the prediction and the predictive routing system as a whole.

Thus, root causing of underperforming changes is an important capability. Indeed, if a change is reverted, the network operator needs to understand why it did not end up being successful. Oftentimes, this is because the conditions that existed at the time of its inception changed in the meantime. Consider, for instance, the scenario of a pair of paths {path1, path2} in which path1 is consistently causing trouble for several months due to an under-provisioned infrastructure on the side of the Internet Service Provider (ISP). In turn, the predictive routing system may suggest the change and it is implemented by the network operator. However, a few weeks later, the ISP upgrades its infrastructure and path1 again offers excellent performance, thus making the change irrelevant (and potentially even detrimental compared to a switch to {path1, path2}). In this case, it may be very useful for the system, along with the notification, to be quite explicit about the fact that a change has occurred in the recent past and provide this information to the end user (e.g., via user interface module 1010).

To achieve the above functionality, stability tracker 1008 may leverage any of a wide range of machine learning. For instance, change point detection can be used to provide useful context in such situations, as this class of algorithms detect abrupt shifts from one regime to another in time series. Stability tracker stability tracker 1008 may continuously scan for such change points in both QoS metrics (when available) of individual paths and in the performance of the corresponding configuration change. If they co-occur in time, then they can be provided by stability tracker 1008 as a candidate root cause to the end user/network operator. In principle, a broad range of other input signals can also be correlated by stability tracker 1008 with change performance and used to augment the list of potential root causes (e.g., global ISP scores from ThousandEyes database, software, or hardware upgrades in the customer network, etc.).

Note that non-conclusive outcomes are expected to be observed in some situations. Indeed, the expected improvement may not be met, or only partially met, without the ability for the system to explicitly tell whether it is due to the change itself or the network/traffic conditions and such a situation may occur, even if the expected improvement is observed.

Finally, change reversion process 249 may be user interface module 1010, which may offer a user interface and/or API, to allow network operators to monitor the performance of past (routing) changes to the network. This can be done both individually and aggregated by site, region, country, etc., as well as globally, in some instances. Such an API/user interface (UI) may be very valuable to network operators, as it allows them to understand and demonstrate the impact on the user experience of their actions to management and end users. Such an API/UI is not intended solely for monitoring, but can also be used to trigger reversions to an implemented change. This can be achieved, for instance, through use of an API associated with the SDN controller, an individual router, or another device in the network. The ability the trigger such a reversion may be either manual or automatic, such as when the system is allowed to do so according to some policy (e.g., revert the change, if the probability of SLA violation increases by x %, revert if the expected improvement is <10%, etc.).

Figure 11:
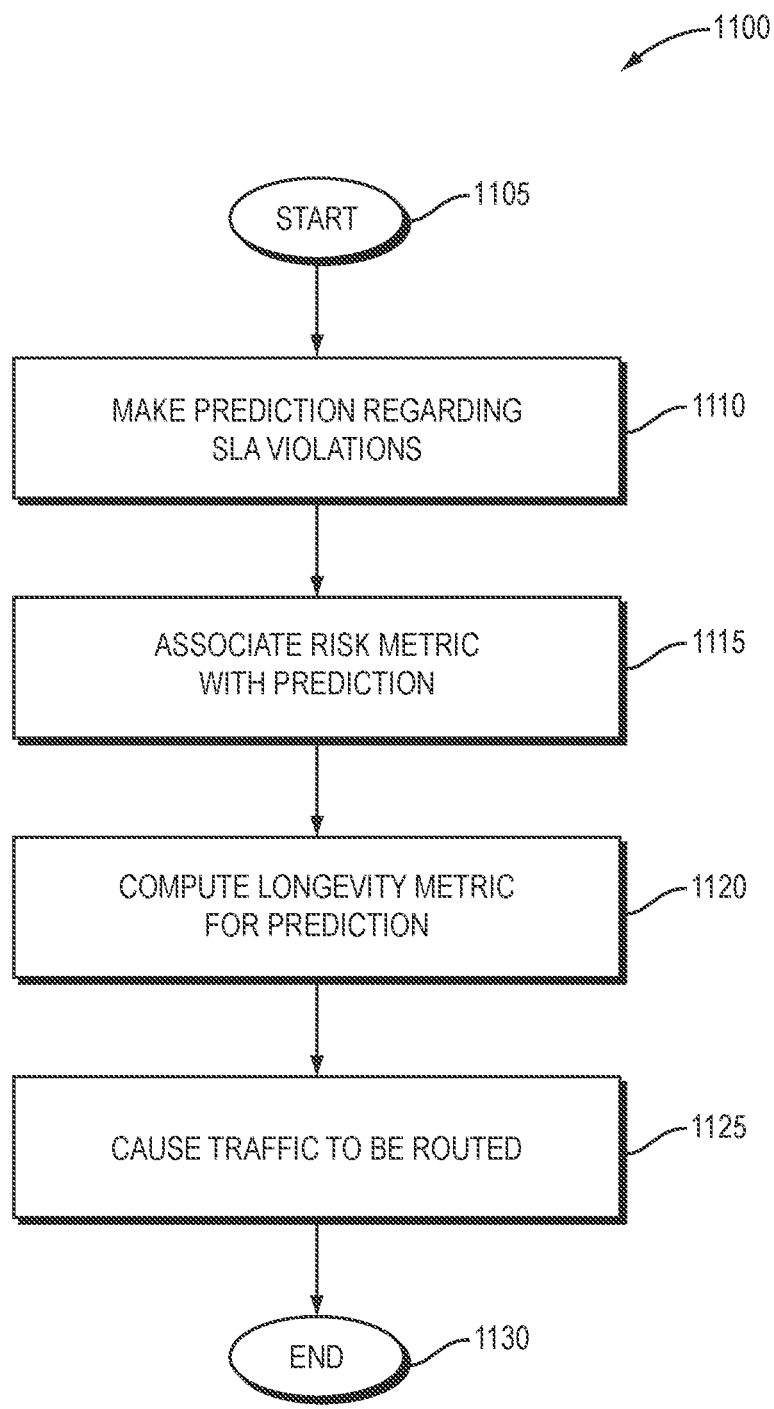
FIG. 11 illustrates an example simplified procedure for predictive routing using risk and longevity metrics.

FIG. 11 illustrates an example simplified procedure 1100 (e.g., a method) for predictive routing using risk and longevity metrics, in accordance with one or more embodiments described herein. For example, a non-generic, specifically configured device (e.g., device 200), such as controller for a network (e.g., an SDN controller, an edge router, or other device in communication therewith) or other supervisory device, may perform procedure 1100 by executing stored instructions (e.g., predictive routing process 248 and/or change reversion process 249). The procedure 1100 may start at step 1105, and continues to step 1110, where, as described in greater detail above, the device may make a prediction regarding service level agreement violations by a network transport available between a site and an online application. For instance, the online application may be an SaaS application. In some embodiments, the prediction may also be a what-if prediction, were traffic for the application routed via that transport.

At step 1115, as detailed above, the device may associate a risk metric with the prediction, based in part on a type of the network transport. In some embodiments, the type of the network transport comprises a metropolitan-area Ethernet connection or a Multiprotocol Label Switching (MPLS) connection, and its risk indicates a low risk of the prediction being unreliable. In other embodiments, the type of the network transport comprises a cellular connection and its risk metric indicates a high risk of the prediction being unreliable.

At step 1120, the device may compute a longevity metric for the prediction that indicates an expected validity period for the prediction, as described in greater detail above. In other words, the longevity metric may represent an amount of time (e.g., days, weeks, months, etc.) for which the prediction will hold true.

At step 1125, as detailed above, the device may cause traffic to be routed between the site and the online application using the network transport, based on the prediction and its associated risk metric and its longevity metric. In some embodiments, the device may do so in part by selecting the network transport from among a plurality of possible network transports between the site and the online application. In another embodiment, the device may cause the traffic to be routed between the site and the online application using the network transport, based in part on the longevity metric exceeding a user-specified threshold. In a further embodiment, the device may do so by providing a routing recommendation to a user interface that recommends routing the traffic between the site and the online application using the network transport. In turn, the device may also use feedback from the user interface regarding the routing recommendation to control further routing recommendations. In further embodiments, the device may also cause the traffic to be routed using a different network transport, when performance metrics associated with the traffic deviate from the prediction by a threshold amount. In addition, the device may also determine a root cause of the performance metrics associated with the traffic deviating from the prediction by a threshold amount. Procedure 1100 then ends at step 1130.

It should be noted that while certain steps within procedure 1100 may be optional as described above, the steps shown in FIG. 11 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments that provide for predictive routing using risk and longevity metrics, it is to be understood that various other adaptations and modifications may be made within the spirit and scope of the embodiments herein. For example, while certain embodiments are described herein with respect to using certain models for purposes of predicting application experience metrics, SLA violations, or other disruptions in a network, the models are not limited as such and may be used for other types of predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:
making, by a device, a prediction regarding a number of service level agreement violations by a network transport among a plurality of possible network transports available between a site and an online application;
associating, by the device and based on a type of the network transport, a risk metric with the prediction, wherein the risk metric is indicative of a risk that the prediction is unreliable;
computing, by the device, a longevity metric that indicates an expected amount of time that the prediction regarding the number of service level agreement violations by the network transport is expected to stay valid; and
causing, by the device, traffic to be routed between the site and the online application using the network transport, based on the prediction, its associated risk metric, and its longevity metric each falling within respective thresholds.

2. The method as in claim 1, wherein causing the traffic to be routed between the site and the online application using the network transport comprises:
selecting the network transport from among the plurality of possible network transports between the site and the online application.

3. The method as in claim 1, wherein the network transport comprises a metropolitan-area Ethernet connection or a Multiprotocol Label Switching (MPLS) connection, and its risk metric indicates a low risk of the prediction being unreliable.

4. The method as in claim 1, wherein the network transport comprises a cellular connection and its risk metric indicates a high risk of the prediction being unreliable.

5. The method as in claim 1, further comprising:
causing, by the device, the traffic to be routed using a different network transport, when performance metrics associated with the traffic deviate from the prediction by a threshold amount.

6. The method as in claim 5, further comprising:
determining a root cause of the performance metrics associated with the traffic deviating from the prediction by a threshold amount.

7. The method as in claim 1, wherein the device causes the traffic to be routed between the site and the online application using the network transport, based in part on the longevity metric exceeding a user-specified threshold.

8. The method as in claim 1, wherein causing the traffic to be routed between the site and the online application using the network transport comprises:
providing, by the device, a routing recommendation to a user interface that recommends routing the traffic between the site and the online application using the network transport.

9. The method as in claim 8, further comprising:
using, by the device, feedback from the user interface regarding the routing recommendation to control further routing recommendations.

10. The method as in claim 1, wherein the online application is a software-as-a-service (SaaS) application.

11. An apparatus, comprising:
one or more network interfaces;
a processor coupled to the one or more network interfaces and configured to execute one or more processes; and
a memory configured to store a process that is executable by the processor, the process when executed configured to:
make a prediction regarding a number of service level agreement violations by a network transport among a plurality of possible network transports available between a site and an online application;
associate, based on a type of the network transport, a risk metric with the prediction, wherein the risk metric is indicative of a risk that the prediction is unreliable;
compute a longevity metric that indicates an expected amount of time that the prediction regarding the number of service level agreement violations by the network transport is expected to stay valid; and
cause traffic to be routed between the site and the online application using the network transport, based on the prediction, its associated risk metric, and its longevity metric each falling within respective thresholds.

12. The apparatus as in claim 11, wherein the apparatus causes the traffic to be routed between the site and the online application using the network transport by:
selecting the network transport from among the plurality of possible network transports between the site and the online application.

13. The apparatus as in claim 11, wherein the network transport comprises an Internet connection, and its risk metric indicates a medium risk of the prediction being unreliable.

14. The apparatus as in claim 11, wherein the network transport comprises a cellular connection and its risk metric indicates a high risk of the prediction being unreliable.

15. The apparatus as in claim 11, wherein the process when executed is further configured to:
cause the traffic to be routed using a different network transport, when performance metrics associated with the traffic deviate from the prediction by a threshold amount.

16. The apparatus as in claim 15, wherein the process when executed is further configured to:
determine a root cause of the performance metrics associated with the traffic deviating from the prediction by a threshold amount.

17. The apparatus as in claim 11, wherein the apparatus causes the traffic to be routed between the site and the online application using the network transport, based in part on the longevity metric exceeding a user-specified threshold.

18. The apparatus as in claim 11, wherein the apparatus causes the traffic to be routed between the site and the online application using the network transport by:
providing a routing recommendation to a user interface that recommends routing the traffic between the site and the online application using the network transport.

19. The apparatus as in claim 18, wherein the process when executed is further configured to:
use feedback from the user interface regarding the routing recommendation to control further routing recommendations.

20. A tangible, non-transitory, computer-readable medium storing program instructions that cause a device to execute a process comprising:
making, by the device, a prediction regarding a number of service level agreement violations by a network transport among a plurality of possible network transports available between a site and an online application;

associating, by the device and based on a type of the
network transport, a risk metric with the prediction,
wherein the risk metric is indicative of a risk that the
prediction is unreliable;
computing, by the device, a longevity metric that indicates an expected amount of time that the prediction
regarding the number of service level agreement violations by the network transport is expected to stay
valid; and
causing, by the device, traffic to be routed between the site
and the online application using the network transport,
based on the prediction, its associated risk metric, and
its longevity metric each falling within respective
thresholds.

* * * * *